July 14, 1953        W. F. O'NEIL        2,645,265
PNEUMATIC TIRE AND METHOD OF MAKING SAME
Filed June 24, 1948        4 Sheets-Sheet 1
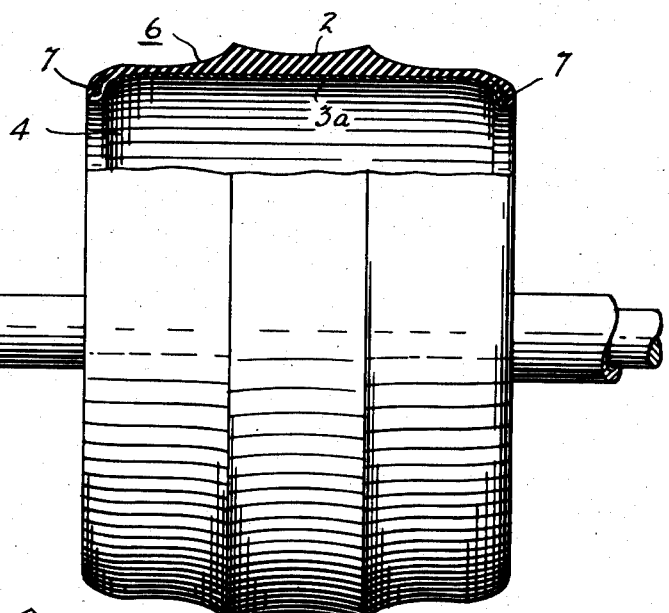
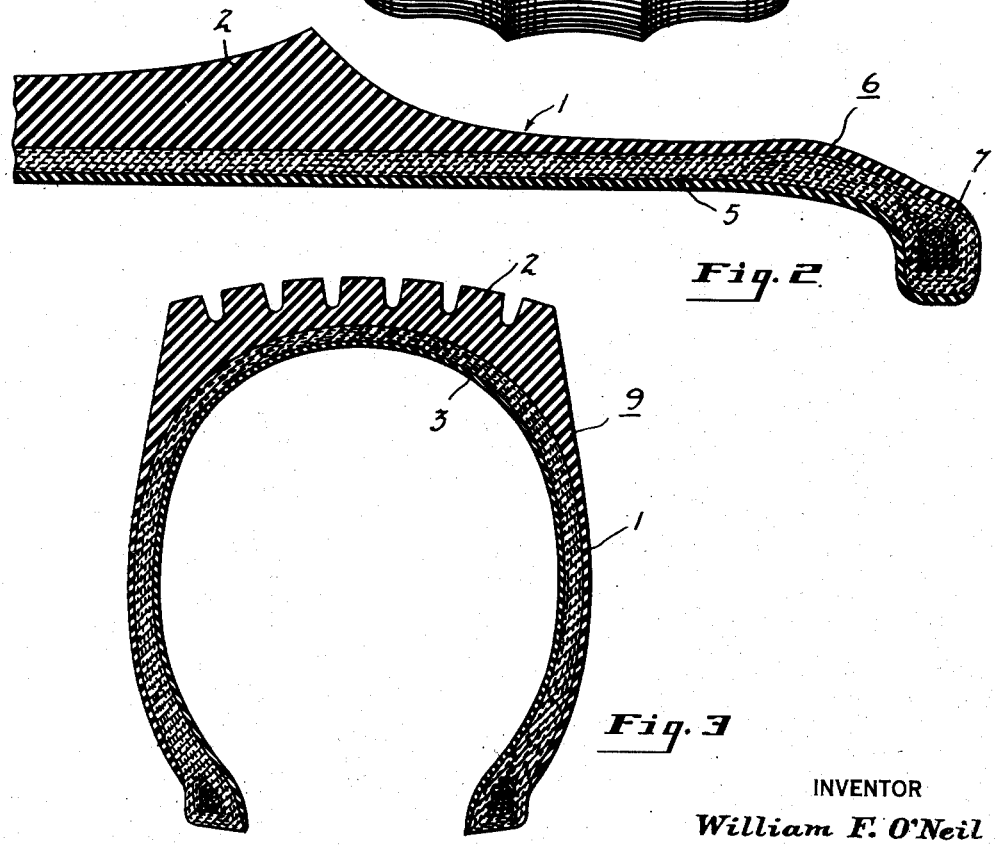
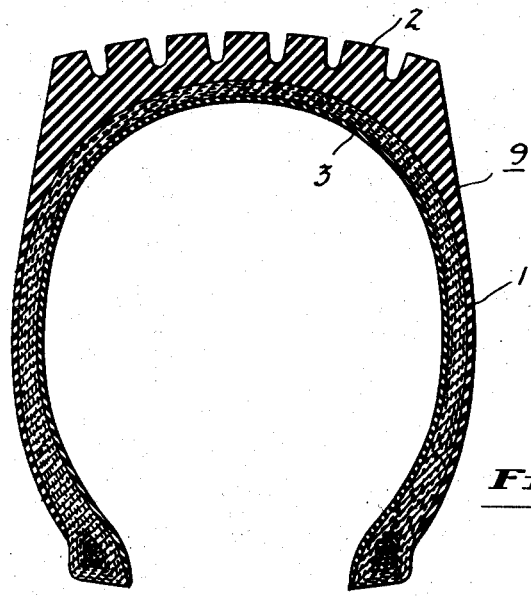
INVENTOR
William F. O'Neil
BY Evans + McCoy
ATTORNEYS July 14, 1953 W. F. O'NEIL 2,645,265
PNEUMATIC TIRE AND METHOD OF MAKING SAME
Filed June 24, 1948 4 Sheets-Sheet 2

INVENTOR
William F. O'Neil
BY
Evans + McCoy
ATTORNEYS

INVENTOR
William F. O'Neil
BY Evans + McCoy
ATTORNEYS

Patented July 14, 1953

2,645,265

UNITED STATES PATENT OFFICE 2,645,265

PNEUMATIC TIRE AND METHOD OF MAKING SAME

William F. O'Neil, Akron, Ohio, assignor to The General Tire and Rubber Company, Akron, Ohio, a corporation of Ohio Application June 24, 1948, Serial No. 35,026

5 Claims. (Cl. 152—354)

This invention relates to a pneumatic tire and to a method of making the same. It particularly relates to a method of making a tire, wherein an air bag is not required, and to a tire which may advantageously be made by such a method.

In the usual processes of making pneumatic tires, the tires are built upon a relatively flat drum having a diameter about the diameter of the bead portions of the tires. Upon removal from the drum, the tires are expanded to toroidal shape and cured in a suitable mold. During the expanding process, where the tire is changed from drum form to toroidal form, an air bag is incorporated within the tire and is utilized as an aid in forming the tire to toroidal shape. These air bags have very thick walls and have an outer shape that corresponds to the inside of a finished tire. In the curing of the tire, the steam or heated fluid is applied to the interior of the air bag and the entire bag is heated to curing temperature. Because of the thickness of this bag, the heat transfer to the tire occurs at a relatively low and unsatisfactory rate, with the result that curing time is prolonged. Deterioration of the air bag at curing temperatures is also quite rapid, so rapid, indeed, that it is frequently impossible to cure more than twenty to thirty tires with a single air bag. The cost of these expensive air bags and their repair is a very appreciable portion of the cost of tires.

Many attempts have been made to cure tires without air bags to eliminate these disadvantages. However, when fluid is applied under pressure directly to the interior of an unexpanded, uncured tire band, the fluid pressure frequently causes separation of the cords or reinforcing members from the uncured rubber, or causes separation between portions of the plies of the tire, so that the completed tire fails prematurely or cannot be used. One solution of this problem would seem to be the lining of the tire band with a thin, cured layer of natural or synthetic rubber. When such a layer of cured natural rubber or other equivalent cured, vulcanized polymer of a material consisting largely of a diolefin is used, difficulties result because of resistance to the shift of cord angles, because of deterioration of the previously cured rubber, or because of wrinkles in the cured layer of rubber during expansion of the tire. These difficulties have prevented the use of an inner layer of a vulcanized elastic rubber compound.

In another method of curing tires, it has been proposed to utilize an air bag in the form of a hollow cylinder or sleeve of rubber sealed at both ends by rigid members to contain air. Such a hollow cylinder had a cylindrical, resilient outer surface with a diameter somewhat smaller than the diameter of the beads of the tire to be cured. Expansion of the tire band was accomplished by applying pressure to the interior of the sleeve during the closing of the mold. While this method eliminated some difficulties due to inflating fluid entering between plies of the tire, it did not prevent the formation of undesirable wrinkles or lumps at portions of the tire sidewall and therefore has also been considered impracticable.

It is an object of the present invention to provide a method of making a pneumatic tire wherein an air bag is not required.

It is another object of the present invention to provide a pneumatic tire band which can be expanded without the use of an air bag to produce a generally toroidal form suitable for curing in a mold.

Another object of the present invention is to provide a pneumatic tire that may be utilized upon appropriate rims to support vehicles without requiring an inner tube.

A still further object of the present invention is to provide apparatus for expanding and curing pneumatic tires without the aid of an air bag.

Other objects will be apparent from the following description of the invention, as illustrated in the accompanying drawings, in which:

Figure 1 is an elevational view of a tire band embodying the present invention, which band is carried by a suitable band building drum, and has portions removed to show the drum upon which it is built;

Fig. 2 is an enlarged, transverse sectional view through a portion of the tire band of Fig. 1 showing the separate elements and layers of which it is composed;

Fig. 3 is a transverse sectional view through a tire embodying the present invention;

Figure 5:
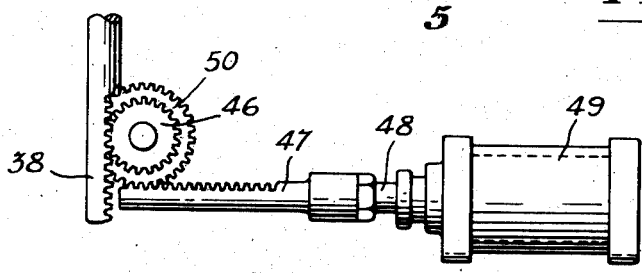
Fig. 5 is an enlarged view of a portion of the apparatus of Fig. 4, as viewed from the line 5—5 of Fig. 4.
Figure 6:
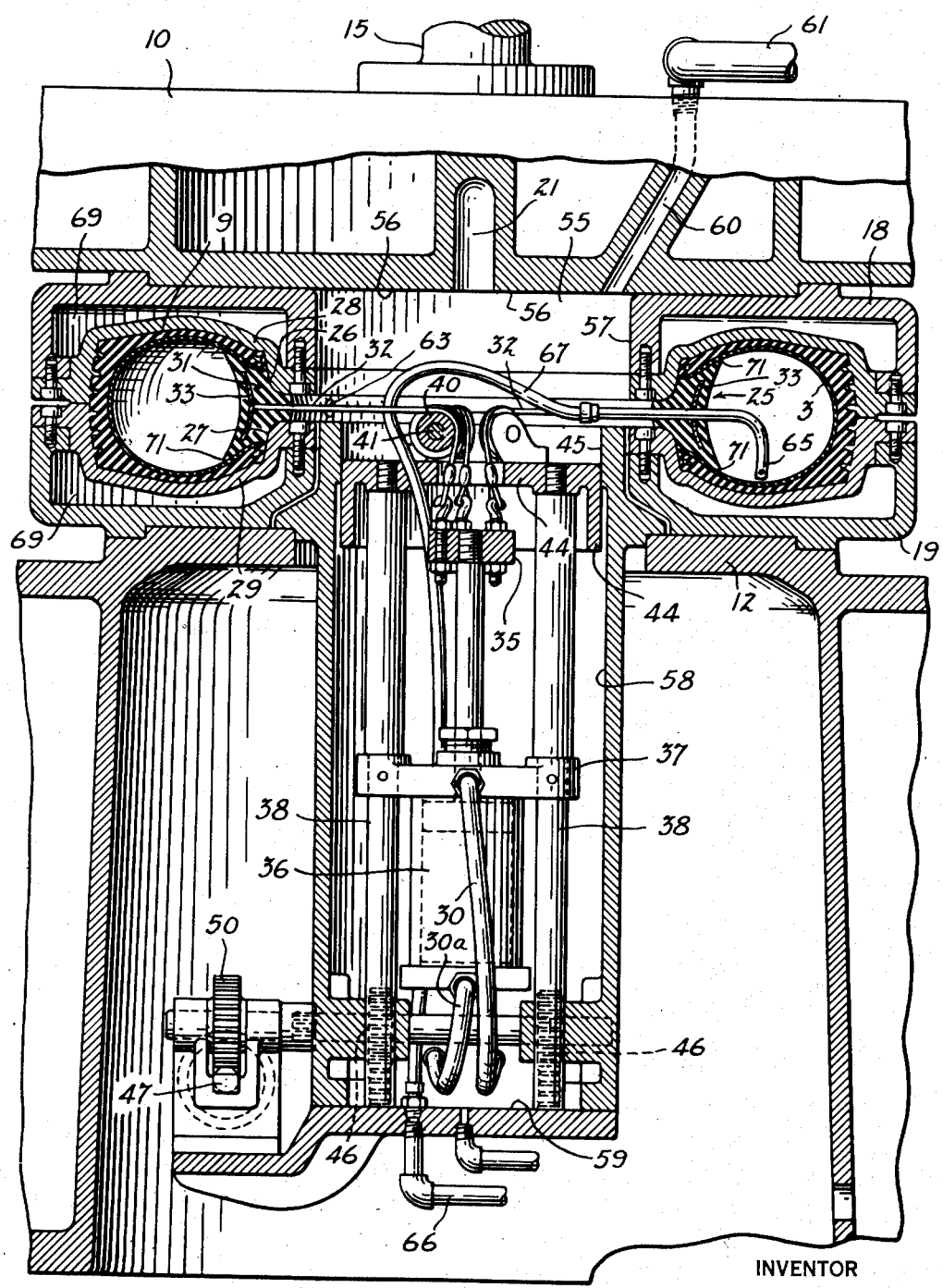
Fig. 6 is an elevational sectional view of a portion of the apparatus of Fig. 4, showing the tire in the position it occupies within the mold during the curing operation.
Figure 7:
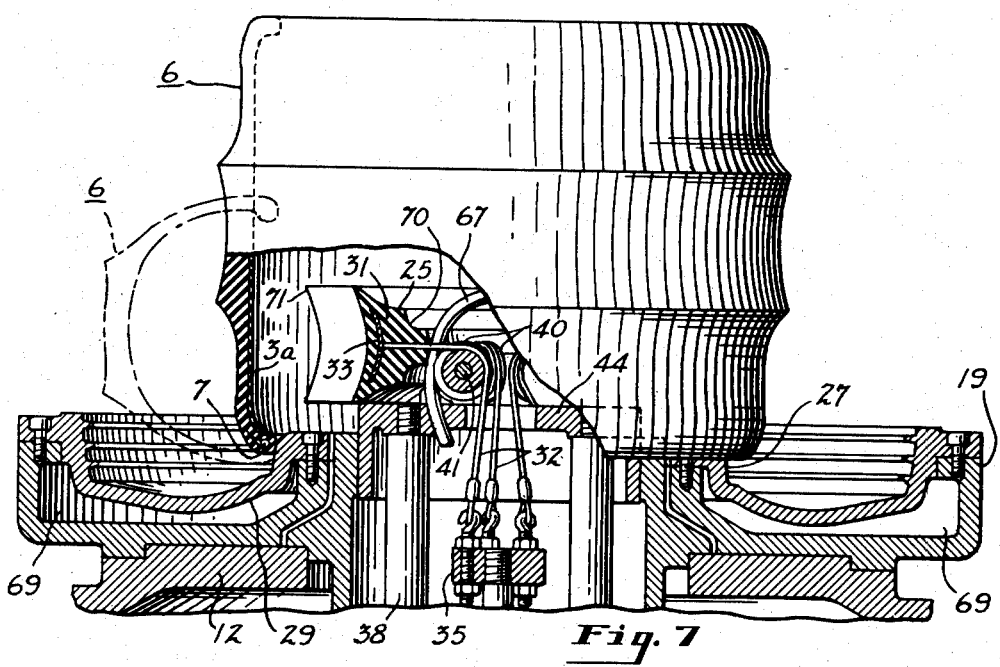
Figure 8:
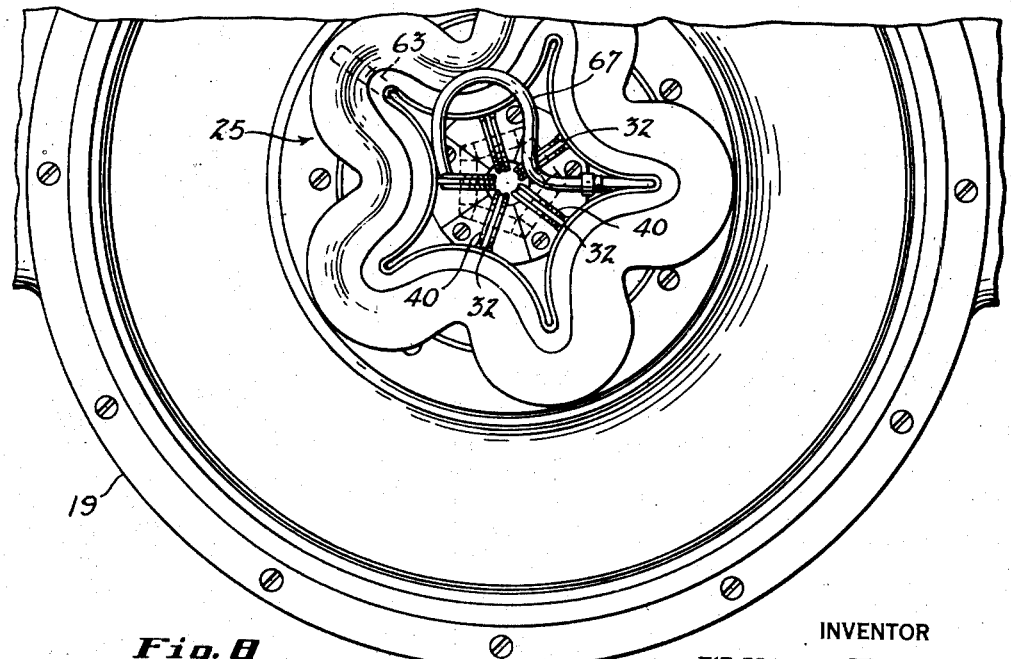

Fig. 7 is a sectional view with a portion of the apparatus of Figs. 5 and 6 showing the composite tire band in a position it occupies prior to expansion and showing outlined in broken lines a portion of the same band in the position it occupies during expansion and just prior to insertion of the bead-shaping bull-ring. A portion of the band is broken away in Fig. 7 to show the position of the component parts of the apparatus when the tire band is placed in the apparatus; and Fig. 8 is a plan view of the composite tire band and the portion of the apparatus shown in Fig. 7 and shows the position and configuration of the resilient bead-forming member when the tire band is placed in the apparatus and when the finished tire is removed from the apparatus.

One phase of the present invention is primarily based upon my discovery that a layer or band of prevulcanized "Butyl rubber" (rubbery copolymer of a diolefine and isobutylene having less than 10% diolefine units) acts quite differently than does a layer or band of vulcanized or unvulcanized natural or synthetic rubbers that contain large amounts of chemical unsaturation. It prevents air leakage between the ply portions of the tire and also prevents the large amounts of undesirable plastic flow of unvulcanized rubber from between the cords or reinforcing members. At the same time the precured layer of "Butyl rubber," being somewhat deformable, permits change in configuration of the stress members of the tire and assumes for its normal molded shape that of the internal surface of the cured tire casing.

In the drawings, where like parts are designated by like numerals of reference throughout the several views, and referring particularly to Figs. 1 to 3, inclusive, it will be seen that the tire may have a conventional carcass portion 1 and a conventional tread portion 2; but the tire contains a nonconventional inside layer 3 of a prevulcanized "Butyl rubber" composition.

In preparing the tire of Fig. 3, the composite tire band 6, which comprises the tread and carcass, is first prepared, expanded to toroidal shape, and cured. The band 6 has the inside lining 3a of a cured vulcanized "Butyl rubber compound" (a compound having "Butyl rubber" as the basic rubber constituent), which was preferably calendered prior to vulcanization or curing of the compound so as to be substantially of uniform thickness. The lining 3a is in the form of a strip or band and forms the toroidal inside layer 3 of the completed tire. In preparing the composite tire band 6, a band or strip of the cured "Butyl rubber" is placed in contact with the drum 4 to form the lining or layer 3a. The various fabric or coated plies and the bead 7 which cooperates with the lining 3a in forming the tire carcass are thereafter assembled over the lining 3a in conventional manner with the innermost carcass ply 5 bearing against and in contact with the lining 3a. Although a bond is not produced when uncured "Butyl rubber" is placed in contact with uncured natural or synthetic rubber which has relatively high unsaturation, the lining 3a being prevulcanized bonds to the inside ply 5 of the tire during vulcanization and expansion of the composite tire band 6. Thus in the finished tire the entire interface between the lining 3 and the innermost ply 5 are strongly bonded together.

In the curing of pneumatic tires without air bags, great difficulty has been experienced in effecting a seal at the beads between the external and internal cavities without causing flow of the uncured rubber at the side walls of the completed tire to cause bunches at the edges of the sealing member. In accordance with another aspect of the present invention, I have discovered that a seal between the interior and exterior of the tire casing may be effected by a suitable flexible, annular bull-ring. The bull-ring of flexible material has tapered peripheral side edges of gradually decreasing thicknesses adapted to bear against the side wall of the tire with pressure that diminishes to a very low value at the inner peripheral edge. The bull-ring is sufficiently flexible to be contracted to a smaller diameter and is proportioned in width and diameter to cooperate with the tire mold to shape the bead portions of the tire in a desired manner.

Figure 4:
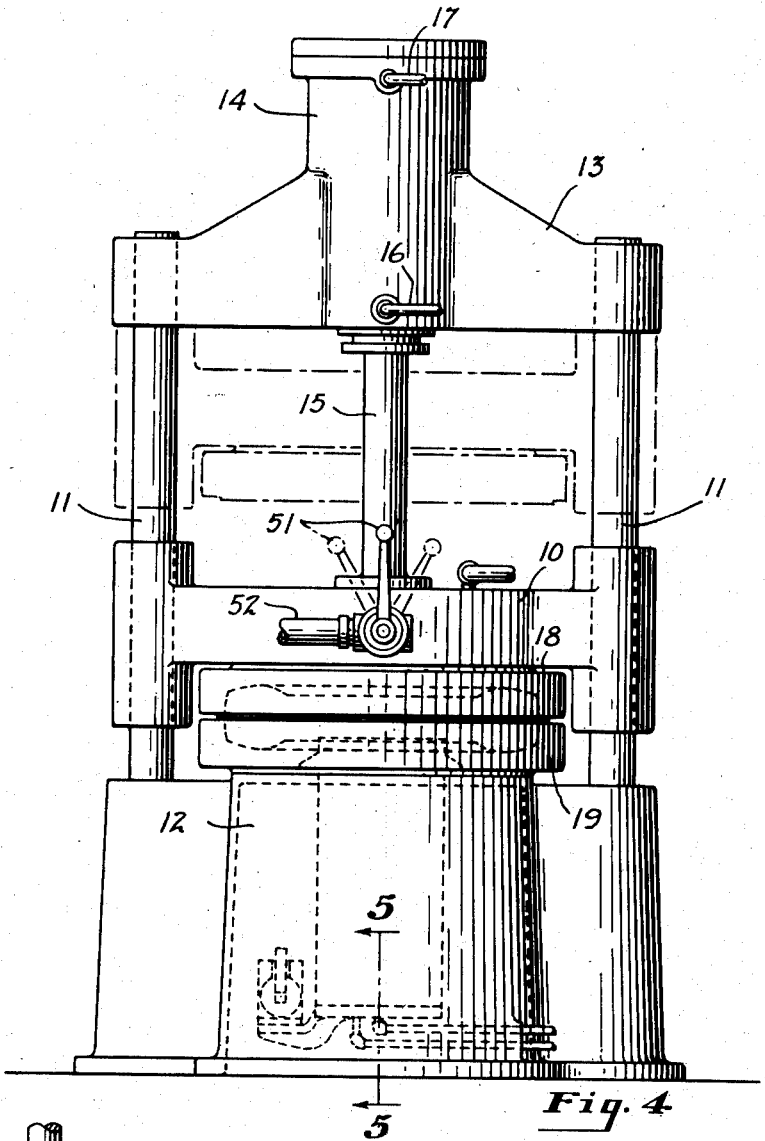
Fig. 4 is an elevational view of apparatus that may be utilized in the process of the present invention for expanding pneumatic tire bands, such as shown in Fig. 1, to toroidal shape within a mold, and for curing such band to produce a tire embodying the present invention.

Figs. 4 to 6, inclusive, illustrate the aspect of the present invention concerned with the expansion to toroidal form of the composite tire band 6, shown in Fig. 1, and the curing of this band to the completed tire shown in Fig. 3.

As illustrated particularly in Fig. 4, the mold comprises suitable means such as a press for controllably moving mold portions to a desired position. The press has a heated upper movable platen 10 which is slidably carried on the guides 11. The guides 11 are rigidly attached to the base 12 and at their extreme opposite ends carry the frame member 13. The frame member 13 rigidly carries the cylinder 14, which contains a piston 15 that is controllably moved upward or downward by hydraulic fluid supplied thereto as desired through the pipes 16 and 17. The lower portion of the piston 15 is attached to the movable platen 10, which carries the upper portion 18 of the tire curing mold. The lower portion 19 of the tire curing mold is suitably attached to the base 12 so that actuation of the piston 15 by controllably admitting air or hydraulic fluid under pressure through the pipes 16 or 17 movably opens or closes the mold. The control of the position of the movable platen 10 is therefore seen to be conventional. It has sufficient movement to permit the portions 18 and 19 of the mold to bear very strongly against each other when in the downward position shown by the full line of Fig. 4, and to permit insertion of the undeformed composite tire band between the mold portions when the mold portions are in an open position.

Tapered flange portions 26 and 27 of the mold cooperate with respective bead portions of the tire to form a fluid-retaining seal therewith and to define a cavity for receipt of expansion fluid through the conduit 21, which receives inflation fluid from the supply pipe 52. The control of this fluid is had by movement of the lever 51.

A flexible bull-ring 25 cooperates with the annular shoulders or flange portions 26 and 27 of the mold and with the upper and lower side wall portions 28 and 29 of the mold to form means for shaping the bead portions of the pneumatic tire 9. The flexible bull-ring 25 has a body portion 31 of resilient material, generally shaped similar to the bead-forming portion of a conventional air bag, but it is provided with retracting means for shrinking its diameter so that it can be readily inserted between the beads of the tire band. Such means preferably comprises means for radially retracting spaced portions of said bull-ring 25 so that it assumes the shape and occupies the position shown in Figs. 7 and 8. In the retracted state the bull-ring has a wavy or undulated outer periphery. The retracting means may include spaced flexible connectors, such as cables 32, each of which may have attached to one end thereof a separate bearing plate 33 of limited extent. The bearing plates 33 are preferably adhered to or bonded to the body portion 31 of the bull-ring 25. The opposite ends of each of the flexible connectors 32 are connected to the movable piston 35 of the floating fluid-actuated cylinder 36. The cylinder 36 is rigidly carried on the cross-piece 37, which is fixedly carried by the racks 38. Intermediate portions of the flexible members 32 ride over the pulleys 40, which are rotatably carried on the shafts 41, so that downward movement of the piston 35 relative to the pulleys 40 causes radial retraction of portions of the bull-ring and formation of undulations in its outer periphery, so that it has a diameter small enough to fit within the composite band 6.

In order that the bull-ring may be properly placed within the tire band upon closure of the mold and expansion of the composite tire band 6 therein, centering means is provided for elevating the bull-ring when it is permitted to expand from the most retracted position into the space between the beads of the tire band 6. This centering means comprises means for suitably moving the plane of the bull-ring and of the pulleys 40 with respect to the lower half of the mold, or the median plane of the tire during opening and closing of the mold. In the apparatus illustrated, the plane of the bull-ring is elevated with respect to the tire band 6 when the mold is opened so that both side edges of the bull-ring are between the planes of the beads of the tire band. The bull-ring is lowered when the mold is closed by the bull-ring centering means.

As shown in Fig. 4 of the drawings, the pulleys 40 of the bull-ring centering and retracting means are carried on the movable piston 44. The piston 44 is adapted to slide within the cylinder 45 and is connected to the racks 38 actuated by rotation of the gears 46, which in turn are actuated by movement of the rack 47 connected to the piston 48 of the air cylinder 49. The piston 48 is controlled by any suitable controlling means (not shown). The rack 47 meshes with the pinion 50 which is on the same shaft with the gears 46.

In order to effect a seal between the mold portions and their appropriate ends of the composite tire band 6 to provide an air or fluid-retaining cavity during the expansion of the tire band 6 to the toroidal shape illustrated by dotted lines in Figure 7, it is important that the transversely extending shoulders or flanges 26 and 27 of the mold (transverse to the plane of the tire) be slightly tapered or have outer surfaces of frusto-conical shape and of minimum diameter, just slightly smaller than the internal diameter of the bead ends of the composite band 6, and a maximum diameter somewhat larger than the opening at the bead end of the composite band 6. The annular shoulders 26 and 27 therefore act as locating and positioning means as well as sealing means for the composite band 6 when it is placed in the open mold with the bull-ring 25 in retracted and undulated position.

The mold portions 18 and 19 are attached to the movable platen 10 and the base member 21, respectively, so as to form a fluid-retaining seal. When the mold portions or halves are together in the position shown in Fig. 6, with the tire therein, the fluid-retaining cavity 55 is defined by the surface 57 of the mold portion 18, including one surface 56 of the movable platen 10, portions of the lower portion of the mold which may for convenience be considered to include the cylinder 45 which has wall portions 58, and end portions 59 connected together in fluid-retaining relation. A passageway 60 through the movable platen 10 is connected to the fluid supply pipe 61 and is provided for controllably supplying heating fluid, e. g. air or steam, or both, to the cavity 55 to supply part of the heat required for vulcanization.

When the mold portions 18 and 19 are separated to retain the undistorted composite band 6 therein with the shoulders 26 and 27 in annular contact with the bead portions of band 6, the cavity is defined by the upper and lower mold portions and by the inner surface of the composite tire band. Fluid is controllably supplied under pressure through the passageway 21 upon closing of the mold and it causes the tire band 6 to become expanded in toroidal form, as shown by the dotted lines in Fig. 6. A passageway 63 through the body 31 of the bull-ring permits entrance of inflation and heating fluid into the interior of the cavity of the tire in the closed mold. A drain 65 extends adjacent the base of the cavity within the tire 9 in the closed mold and is connected to the valved drain pipe 66 through the flexible tube 67. This permits the condensate to be withdrawn from the interior of the tire during the curing operation.

In the curing of tires in accordance with the present invention, the mold is first opened by movement of the upper platen to the position shown by the dotted lines of Fig. 4. This is accomplished by incorporation of air or hydraulic fluid through the pipe 16. After the mold is opened the fluid is supplied to the cylinder 49 to cause elevation of the piston 44 to the position shown in Fig. 7, so that the bull-ring may be pulled upwardly away from contact with the frusto-conical surface 27. Fluid is then supplied through the flexible tube 30 which causes the piston 35 to be moved downwardly and retracts the bull-ring 25 to a smaller diameter with an undulated outer periphery. The composite tire band 6 is thereupon placed over the bull-ring with one bead end in annular contact with the annular external frusto-conical surface of the shoulder 27 as shown in Fig. 7. The upper platen is then moved downwardly until contact is made between the upper frusto-conical surface 26 and the upper edge of the composite band 6. Inflation fluid is thereupon supplied through the supply pipe 61 and the passageway 60 into the cavity 55 as enlarged by the internal volume of the opening within the composite band 6, whereupon continued downward movement of the movable platen 10 the band assumes the partially expanded form or intermediate toroidal shape, shown by the dotted lines in Fig. 7. Fluid is thereupon admitted to the lower portion of the cylinder 36 through the flexible tube 30a to cause upward movement of the piston 35, which movement permits the resilient bull-ring to expand to circular shape with its outer periphery in the cavity within the intermediately expanded composite band 6.

When the bull-ring 25 is expanded to circular shape, the upper and lower positioning portions 70 are adapted to contact portions of the flanges 26 and 27, respectively, upon complete closure of the mold. After the bull-ring 25 has been expanded to circular shape so that it has entered the cavity of the intermediately expanded tire band, the piston 46 of the cylinder 49 is retracted to cause downward movement of the rack 38 and the piston 44 to the position shown in Fig. 6. Just prior to complete closure of the mold, expanding fluid may be suitably released from the cavity 55 and steam or heating fluid, under relatively high pressure, is admitted to the cavity 55. The heating fluid enters the cavity of the tire 9 through the opening 63 in the bull-ring 25 to force the tire strongly against the walls of the mold. Heating fluid is also suitably applied to the cavity 69 by suitable means, not shown, to heat the external surface of the tire. Since the bull-ring 25 has relatively long flexible sealing edges 71 at its upper and lower surfaces, pressure against the uncured tire band is sufficiently relieved to prevent appreciable concentration of flow of the plastic material from portions of the tire.

The "Butyl rubber" layer 3 has the unique feature of permitting plastic flow to a sufficient degree to permit change in cord angles and change in expansion of the tire band without causing permanent wrinkles in the interior of the completed tire. Yet, it effectively prevents leakage of inflating or heating fluid between portions of the layers of the uncured tire to cause the difficulties aforementioned.

The "Butyl rubbers" are prepared by copolymerizing isobutylene and a diolefinic compound, such for example as butadiene or isoprene, at exceedingly low temperatures with the aid of an acidic catalyst, such for example as aluminum chloride. The amount of diolefin units is relatively small, less than 10% and preferably less than 3% of the composition.

Although the invention may be employed in various ways, only preferred embodiments have been illustrated and described. Other embodiments may be made within the invention as provided by the patent statutes.

What I claim is:

1. In a method of making pneumatic tires wherein a band having continuous beads at each end thereof and a plurality of plies of stretch-resistant elements connecting said beads is formed and said band is expanded to generally toroidal shape and cured in a mold in said toroidal shape, the steps which comprise forming around the entire inner periphery of said band and between the bead portions an inner layer of cured fluid tight, compounded rubbery copolymer of isobutylene and a diolefinic compound, which copolymer contains less than 10% of said diolefinic compound, said inner layer underlying the entire surface of the inner ply of said band and being bonded thereto, expanding said band to a toroidal form by forming a closed chamber in which said cured band is an outer cylindrical wall and introducing fluid under pressure into said chamber while simultaneously moving said beads toward each other, and thereafter curing said toroidally shaped band with the aid of heat and pressure of a fluid incorporated directly into the cavity thereof, whereby necessity of using annular shaped air bags is eliminated.

2. In a method of making pneumatic tires wherein a band having continuous beads at each end thereof and a plurality of plies of stretch-resistant elements connecting said beads is formed and said band is expanded to generally toroidal shape and cured in a mold in said toroidal shape, the steps which comprise disposing over the entire inner surface of said band and in adhesive contact therewith a layer of a vulcanized, compounded rubbery copolymer of isobutylene and a diolefinic compound, a placing in said band a retracted bull-ring expansible to a diameter greater than the maximum inside diameter of said band, said bull-ring having in its expanded state peripheral side edges for cooperating with portions of said mold in shaping bead portions of said band and for pressing said bead portions strongly against side portions of the closed mold, expanding said band to toroidal shape by forming with mold portions a closed chamber in which said cured band of said compounded copolymer is an outer, generally cylindrical wall, applying fluid under pressure into said chamber while simultaneously moving portions of said mold and bead portions of said band toward each other, expanding said bull-ring into said band between the bead portions of said band when said band is in a partly expanded state, and while the bead portions are separated from each other by a greater distance than the width of said bull-ring, bringing the bead portions of said band together until they tightly bear against opposite side edges of said bull-ring along substantially the entire periphery thereof, and applying heating fluid under pressure to the interior of the cavity formed by cooperation of the inner layer of said expanded band and said bull-ring to force the band strongly against the mold and to cure said band in the desired shape, whereby the necessity for air bags during curing is eliminated.

3. Apparatus for curing and expanding pneumatic tires without an air bag, comprising a mold having separable portions defining a cavity of the general external shape of a pneumatic tire, means for controllably moving said mold portions relative to each other to permit insertion therebetween of an unexpanded composite tire band with one bead portion thereof bearing against one mold portion and the other bead portion thereof bearing against another mold portion separated from the first-named mold portion, each of said mold portions having a tapered shoulder portion for cooperating with the bead portions of said composite tire band to form a seal and a fluid-retaining cavity defined by said composite tire band and upper and lower mold portions, means for controllably introducing fluid under pressure into the cavity thus formed, a flexible bull-ring having in its normal unflexed state a diameter greater than the diameter of bead portions of the unexpanded tire band, having a body portion adapted to cooperate with portions of said mold portions to shape the bead portions of the tire during the molding thereof, and having tapered peripheral side edges to bear against the opposite side walls of said tire band to effect a seal with said side wall portions after the tire band has been expanded to toroidal shape, said flexible bull-ring being retractable to smaller diameter to permit its incorporation into said tire band, and means for contracting said bull-ring to expand by its own resilience into the tire band between the beads thereof and for releasing said contraction when said band is in the partially expanded condition, said bull-ring having a passageway to permit passage of heating fluid into direct contact with the interior of said tire band when said mold portions are in the closest proximity to each other.

4. In the apparatus of claim 3, means for changing the plane of said bull-ring with respect to at least one of said mold portions between the interval when said molded portions are most widely separated and when they are in closest proximity to one another, whereby said bull-ring is positioned in said band without interference by said beads.

5. In a pneumatic tire having a tread portion and a carcass portion provided with a plurality of plies of stretch-resistant elements embedded in rubberlike material and extending between and suitably connected to annular beads, the improvement which comprises an inner liner of a vulcanized, rubbery, low temperature copolymer of a diolefin and isobutylene, which copolymer contains less than 10% of said diolefin, said liner being vulcanized to the elastic state and being a layer bearing against rubber over the entire inner surface of said carcass between said beads and said rubber of said carcass being vulcanized to said inner liner over the entire carcass-liner interface.

WILLIAM F. O'NEIL.

References Cited in the file of this patent

UNITED STATES PATENTS

| Number | Name | Date |
| --- | --- | --- |
| 1,827,668 | Musselman | Oct. 13, 1931 |
| 1,903,575 | Shoemaker | Apr. 11, 1933 |
| 1,949,057 | Leguillon | Feb. 27, 1934 |
| 2,007,825 | Day | July 9, 1935 |
| 2,243,532 | Maynard | May 27, 1941 |
| 2,296,800 | Soderquist | Sept. 22, 1942 |
| 2,337,857 | Soderquist | Dec. 28, 1943 |
| 2,354,446 | Brown | July 25, 1944 |
| 2,356,128 | Thomas et al. | Aug. 22, 1944 |
| 2,495,663 | Soderquist | Jan. 24, 1950 |
| 2,495,664 | Soderquist | Jan. 24, 1950 |
| 2,519,231 | Crawford et al. | Aug. 15, 1950 |
| 2,587,428 | Antonson | Feb. 26, 1952 |
| 2,592,724 | O'Neil | Apr. 15, 1952 |